3,465,642
COPYING MILLING MACHINE
Konrad Bschorer, Wolfratshausen-Waldram, and Johann Muller and Josef Ostler, Munich, Germany, assignors to Friedrich Deckel Prazisions Mechanik und Maschinenbau, Munich, Germany, a firm of Germany
Filed Sept. 19, 1967, Ser. No. 668,832
Claims priority, application Germany, Sept. 21, 1966,
D 51,143
Int. Cl. B23c 1/16, 1/18
U.S. Cl. 90—13.1                                10 Claims

ABSTRACT OF THE DISCLOSURE

There is disclosed a copying milling machine in which the relative movements between the workpiece and the milling cutter are controlled by hand, with provision for such movements to be performed either by servo-motors (e.g., in the case of rough milling) or by direct manual force (e.g., in the case of fine finishing milling). In the former case, the milling cutter is held stationary relative to the machine frame, and the relative movements between the milling cutter and the workpiece are performed by moving the work table, and the pattern table which is connected to and moves with the work table. In the second case, where hand power is used to perform the relative movements, the work and pattern tables remain stationary, and the milling cutter moves relative to the machine frame. When servo-motor power is used, a servo-controller is mounted rigidly with respect to the holder of the milling spindle, and the feeler or stylus is supported from the holder of the milling spindle with a slight amount of play and is connected to the control member of the servo-controller so that the relative movements between the stylus and the holder of the milling spindle cause operation of the control member of the servo-controller, to operate the servo-motors to move the workpiece and the pattern in the desired way. For hand power operation, the servo-controller is removed and replaced by a plug which serves to connect the feeler rigidly to the holder of the milling spindle, eliminating the play present when servo-control is used.

BACKGROUND OF THE INVENTION

A copying milling machine is a machine for milling a workpiece in accordance with a pattern or template, to reproduce on the workpiece some or all of the features or configurations of the pattern or template. Many forms of copying milling machines are known in the art.

The present invention relates to the type of copying milling machine in which the relative movements between the pattern and the feeler (sometimes called the tracer or the stylus) are controlled by the hand of the operator, and in which such relative movements cause corresponding relative movements between the workpiece and the milling spindle containing a milling tool or other suitable power driven tool. The relative movements between the workpiece and the milling spindle are power driven in the present machine, by servo-motors, when rough milling is being done, but are performed by manual pressure from the hand of the operator, during the finishing or fine milling operation.

A machine similar in some respects to the present machine is disclosed in U.S. Patent 3,266,375, granted Aug. 16, 1966 for an invention of Rudolf Reeber and Johann Müller, the latter being one of the joint applicants of the present application. The present invention may be regarded as an improvement on the machine disclosed in said patent. In the present invention, as compared with said patent, there is improved means for mounting the servo-controller and for mounting the holder or carrier of the feeler, and improved means for connecting the feeler to the control member of the controller, as well as other improvements which will be apparent to those skilled in the art who are familiar with said patent. According to the present invention, the change-over from servo-powered movements to manually powered movements, or vice versa, can be accomplished quicker, easier, and more efficiently than in said patent. Also, in the present invention, both rough milling and finish milling are accomplished from a single milling spindle, whereas in said patent two separate spindles are needed. Moreover, in the present invention the spindle holder remains stationary relative to the machine frame, during all of the servo-controlled operations, and the necessary relative movement between the milling tool and the work is accomplished by moving the work table in three coordinate directions relative to the machine frame, whereas in said patent it is the tool and the feeler which move relative to the machine frame in a vertical direction and in at least one horizontal direction, during servo-controlled milling.

BRIEF DESCRIPTION OF THE DRAWINGS

In the accompanying drawings, which constitute a material part of the present disclosure and are incorporated herein by reference, and which relate to an illustrative embodiment of the invention.

DESCRIPTION OF THE PREFERRED EMBODIMENT

Figure 1:
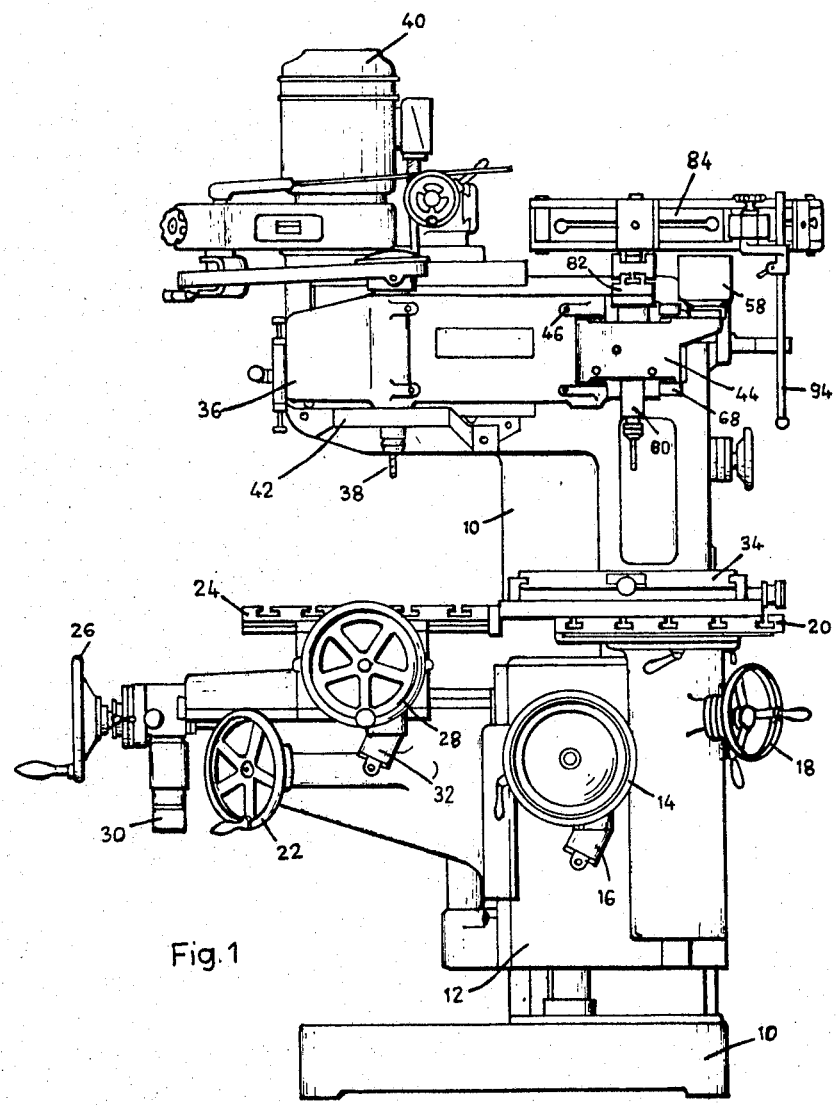
FIG. 1 is a front elevation of a copying milling machine in accordance with a preferred embodiment of the invention.
Figure 2:
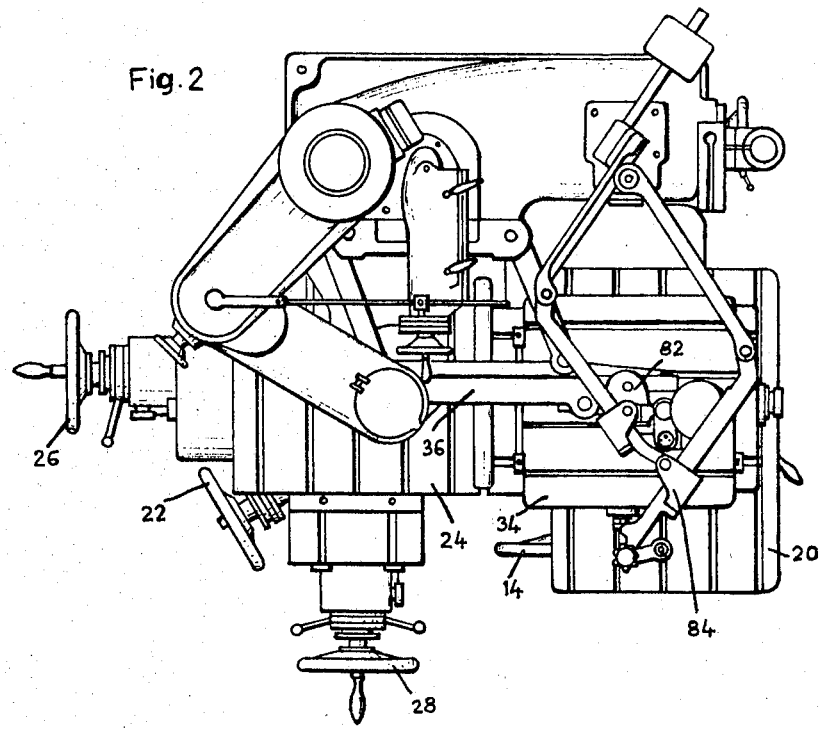
FIG. 2 is a plan of the same.

Referring now to FIGS. 1 and 2, a preferred embodiment of the machine of the present invention comprises a main frame part 10 including a base and an upright column rising from the base, and a knee 12 movable vertically on the column by means of a handwheel 14 and a hydraulic motor 16. A handwheel 18 serves for vertical adjustment of a pattern table 20 carried by and supported from the knee 12. A work table 24, for carrying the workpiece to be milled, is vertically movable on the knee 12 by a handwheel 22 and supported from the knee 12 by a compound slide, so that the work table is movable in one horizontal direction by the handwheel 26 and in the coordinate horizontal direction at right angles thereto by the handwheel 28. Hydraulic motors 30 and 32 are connected to these two handwheels, respectively. The work table 24 is connected to a drag table 34 on which the pattern or template is placed, this drag table 34 being developed as a compound table supported from the table 20 and movable in two horizontal directions at right angles to each other, in accordance with the movements of the work table 24.

Above the tables 20 and 24 there is arranged a tool holder 36 in the form of a beam guided for displacement parallel to itself in three coordinate directions mutually perpendicular to each other, that is, vertically and in two horizontal directions. Such beams are well known and conventional in the machine tool art, and since the details thereof are not important for purposes of the present invention, such details are not illustrated or further described here. The tool holder 36 carries a vertical spindle in which a milling tool 38 is detachably and replaceably mounted. The spindle and the tool mounted thereon are driven by a conventional belt drive of well known construction from a motor 40.

Because the tool holder beam 36 is movable in three coordinate directions relative to the machine frame 10, it follows that the milling tool 38 is also movable in these three coordinate directions, unless restrained. For the fine milling operation performed by hand, such movement of the milling tool 38 is desired. However, for the rough milling operation using servo-control, it is preferred to move the work rather than the milling spindle, and therefore a removable holder 42 is provided, in the form of a bracket screwed or bolted to the stationary frame 10. When this holder 42 is in place, it tightly surrounds the lower end of the spindle housing and prevents any movement of the spindle housing or tool holder relative to the stationary frame part 10. When the holder or blocking member 42 is unscrewed and removed, the spindle housing and the entire tool holder beam 36 are free to move in all three mutually perpendicular coordinate directions relative to the frame 10.

Figure 3:
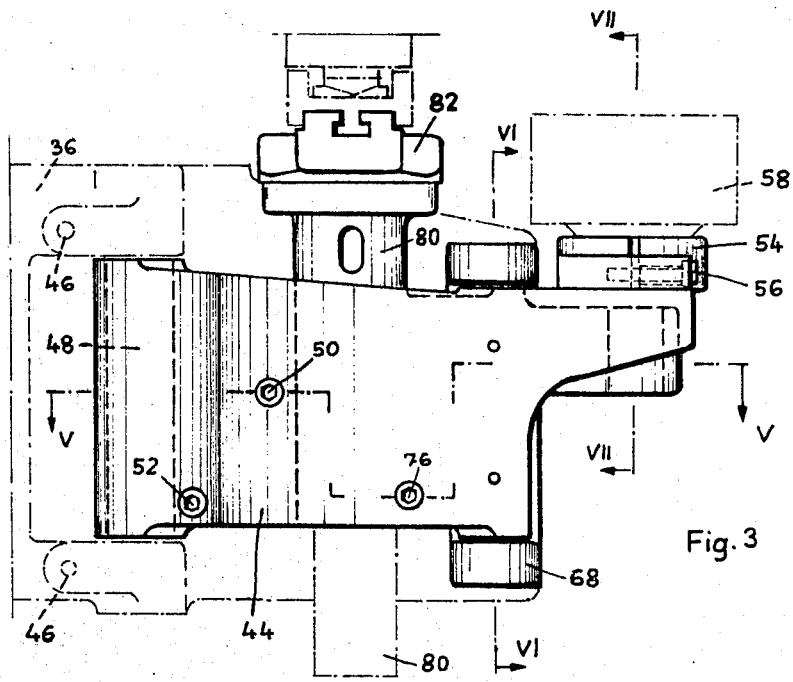
FIG. 3 is a front elevation of an attachable bearing part having means for holding a feeler and a servo-controller, certain related parts being shown in broken lines.
Figure 4:
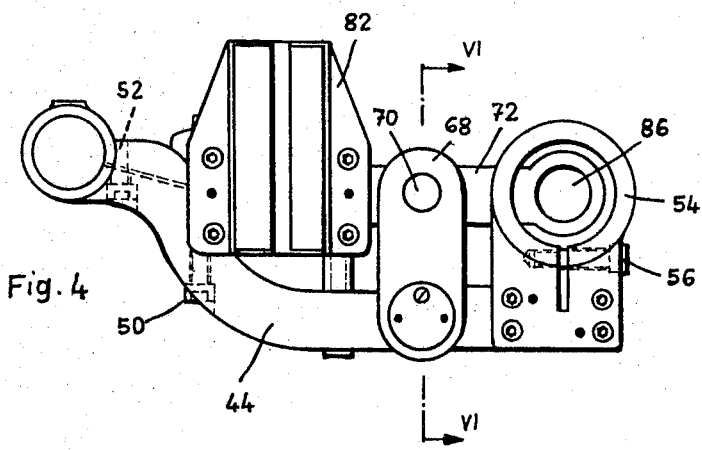
FIG. 4 is a top plan view of the parts shown in FIG. 3.
Figure 5:
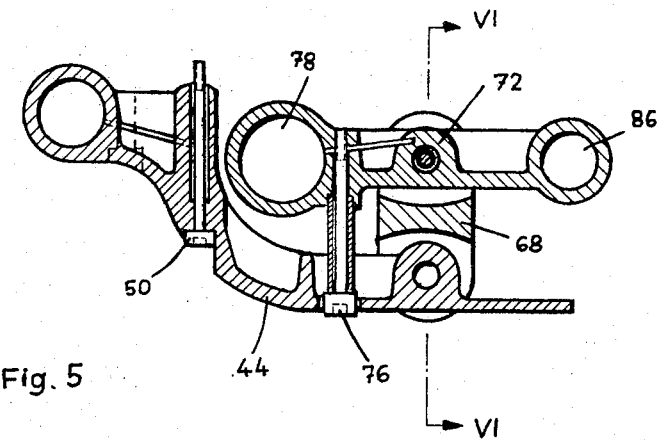
FIG. 5 is a horizontal section taken approximately on the line V—V of FIG. 3.

A support member 44, best seen in FIGS. 3–5, is detachably mounted on the front of the tool holder or beam 36. For attaching this support member 44, set screws 46 (FIGS. 1 and 3) serve to hold a vertical bolt 48 in fixed position on the tool holder 36, and the left end of the supporting member 44 has a vertical bore or socket which embraces the bolt 48. A clamping screw 50 (FIGS. 3–5) passes horizontally through the supporting member 44 and into the tool holder 36. In addition, the socket in the member 44 through which the bolt 48 extends, is split and can be tightened onto the bolt by tightening a clamping screw 52. Thus the supporting member 44 is firmly and immovably clamped to the tool holder or beam 36 so as to constitute, in effect, a part of the tool holder 36.

Figure 8:
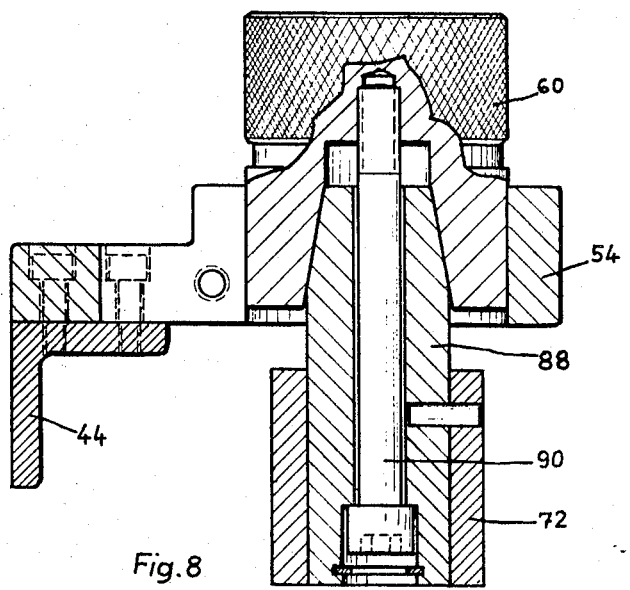
FIG. 8 is a view similar to FIG. 7, with the servo-controller removed and replaced by a connecting plug which provides a rigid connection between the feeler and the milling spindle holder.
Figure 7:
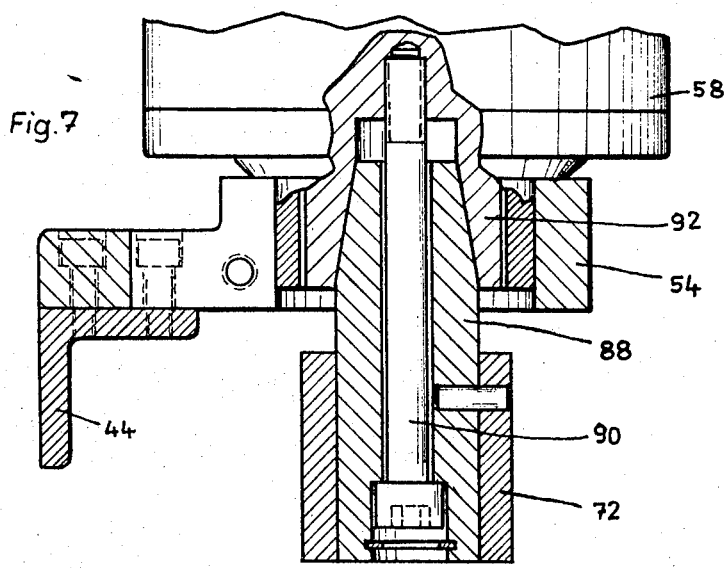
FIG. 7 is a vertical section approximately on the line VII—VII of FIG. 3, with a servo-controller in operative position.

The right hand end of the supporting member 44 carries a horizontal annular flange 54 which is split so that it can be tightened by a clamping screw 56. This annular flange constitutes a socket for receiving, alternatively, either a conventional servo-controller 58 of known form, as shown in FIG. 7, or a connecting plug 60, as shown in FIG. 8, the selected article being clamped fast in either case by tightening the screw 56.

Figure 6:
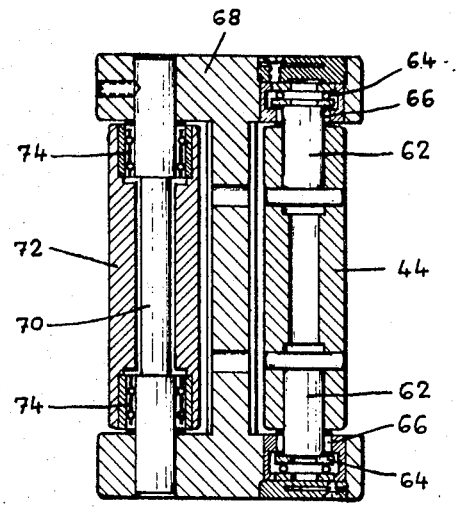
FIG. 6 is a vertical section taken approximately on the line VI—VI of FIGS. 3, 4, and 5.

At an intermediate point in the length of the supporting member 44, a little to the left of the socket 54, the member 44 carries vertically extending pinned bolts 62 (FIG. 6) which, through thrust bearings 64 and needle bearings 66, support a rocking lever 68 swingable horizontally to a limited extent. The rear end of this swinging lever 68 carries a vertical shaft 70. A double-armed lever 72 is mounted near its middle on this shaft 70, and is not only swingable horizontally but also movable vertically to a limited extent on the shaft 70, the mounting being by means of ball bearing slides 74.

A clamping screw 76 (FIGS. 3 and 5) serves to tighten a split vertical socket or bore 78 at the left end of the lever 72. This socket 78 receives the mount 80 of a feeler (also called a tracer or a stylus) which is adapted to make contact with the pattern or template while the milling tool 38 makes contact with the workpiece. The feeler holder 80 is, of course, firmly clamped in the socket 78 by tightening the screw 76. On the top of the feeler holder 80 is a connecting piece 82 of conventional known form, for connecting the feeler mount with the pantograph indicated in general at 84 (FIGS. 1 and 2), which pantograph is of known conventional form familiar in machines of this general character, and need not be further described or illustrated.

At the right hand end of the two armed lever 72, is a vertical bore or socket 86 (FIGS. 4 and 5) in which is pinned a longitudinally bored bolt 88 (FIGS. 7 and 8) the upper conical end of which projects upwardly beyond the lever 72 and extends approximately concentrically within the previously mentioned annular flange 54. By means of the screw 90 which extends up through the bore in the bolt 88 and is screw threaded at its upper end, the conical upper end of the bolt 88 may be firmly clamped into a conical socket in the lower end of the control member 92 of the servo-controller 58, when the servo-controller is in place in the annular socket 54, or into a conical socket in the bottom of the plug 60 when the plug is mounted in the socket 54 instead of the controller.

The pantograph 84 is provided with the usual conventional handle 94 adjustable to various positions along one arm of the pantograph, to whatever location is most convenient to the operator. By grasping the handle 94, the operator applies manual pressure to move the pantograph in any desired direction, and such movement is transmitted, through the connection 82, to the feeler holder or mount 80. During rough milling, when the tool holder beam 36 is held immovable by the bracket 42 and when the workpiece rather than the milling tool is being moved, the movement of the feeler mount 80 is only a very slight movement, which is sufficient, however, to operate the control member 92 of the servo-controller 58. As mentioned in said patent, a very slight movement of the control member 92 relative to the controller body 58 is sufficient to operate the servo-control mechanism; such movement can be as small as 0.1 millimeter, in any direction from a neutral central position, or possibly 0.2 millimeter, or of that order. In any event, the movement necessary to operate the controller is so slight that no account need be taken of the fact that the feeler holder 80 and the tapered bolt 88 move on arcs on the pivots 62 and 70, rather than moving along straight lines. With such slight movements, the difference between movement along an arc of this kind and movement along a true straight line is immaterial and can be neglected.

In operation, the workpiece is mounted on the table 24 and the template or pattern is mounted on the drag table 34 which moves with the table 24. For the rough milling operation, the bracket 42 is screwed tightly in place, thus holding the tool holder 36 immovable with respect to the machine frame, but the feeler holder 80 is capable of the above mentioned slight movements relative to the stationary tool holder 36, which slight movements are transmitted through the levers 68 and 72, to the control member 92 of the servo-controller 58. Through the conventional and well known connections between the servo-controller 58 and the respective hydraulic motors 16, 30, and 32, the work table 24 and the drag table 34 connected to it, are moved in the proper directions relative to the stationary machine frame and the stationary milling spindle holder 36. For example, if the hand of the operator applies pressure to the handle 94 in a direction to move the feeler mount 80 to the left when viewed as in FIG. 1, the corresponding movement of the control member 92 of the controller 58 causes operation of the hydraulic motor 30 to move the tables 24 and 34 to the right. Similarly, if upward pressure is applied to the handle 94 so as to move the feeler mount 80 slightly upwardly, the corresponding upward movement of the control member 92 of the controller 58 causes the controller, through its connections to the hydraulic motors, to operate the motor 16 to move the knee 12 downwardly. Movement of the feeler mount 80 in any direction relative to the stationary beam 36 acts on the control member 92 of the servo-controller 58 to cause the proper movement of the work table 24 and pattern table 34 in the proper direction.

For the fine milling operation, after conclusion of the rough milling, the screws which hold the bracket 42 to the frame of the machine are removed, and the bracket 42 is removed. This frees the tool holder beam 36 for movement relative to the machine frame in all three coordinate directions mutually propendicular to each other. The clamp screw 56 of the annular socket 54 is loosened, and the controller 58 is removed from the socket, after first loosening the screw 90. The plug 60 is then placed in the socket 54 and the clamp screw 56 is tightened to hold the plug 60 firmly in the socket 54, and the screw 90 is screwed upwardly into the plug 60 in order to wedge the bolt 88 firmly into the conical opening in the plug 60. This serves to eliminate the slight movement previously possible between the feeler holder 80 and the tool holder 36, so that the feeler holder 80 is now rigidly connected to the tool holder 36. The parts are now ready for the fine milling operation, where manual power is applied to the handle 94, to move the feeler in the holder 80 not merely through the very small control movements previously described, but through the full movements required to cause the feeler to contact with all desired parts of the pattern surfaces, while the tool 38 moves correspondingly over the workpiece on the table 24. During this fine milling operation, the workpiece and the pattern do not move relative to the machine frame, except as may be ncessary from time to time to adjust the position of the workpiece and the pattern to bring them to more convenient positions relative to the milling tool and the feeler.

It is seen that the translation from power operated milling movements during the rough milling operation, to hand operated milling movements during the finishing operation, is very quick and easy. Only a single milling spindle is used, for both the rough operation and the finishing operation, and only a few simple changes are necessary to shift from one type of operation to the other.

It is to be understood that the disclosure is given by way of illustrative example only, rather than by way of limitation, and that without departing from the invention, the details may be varied within the scope of the appended claims.

What is claimed is:

1. A copying milling machine comprising a frame, a work table and a pattern table conjointly movable relative to said frame in at least two coordinate directions perpendicular to each other, servo motors for moving said tables in said directions, a milling spindle holder mounted for movement relative to said frame independently of said tables in at least two coordinate directions perpendicular to each other, detachable clamping means for clamping said spindle holder in fixed position relative to said frame, a receiving member fixed to said spindle holder for detachably receiving a servo-controller body having a control member movable with respect to the body, a feeler holder mounted for slight limited play relative to said spindle holder in at least two coordinate directions perpendicular to each other, and connecting means operatively connecting said feeler holder to said control member of said controller body to cause said control member to move relative to said controller body in accordance with movements manually imparted to said feeler holder relative to said spindle holder, said servo motors being responsive to movements of said control member relative to said servo-controller body.

2. A construction as defined in claim 1, in which said tables are movable relative to said frame in three coordinate directions mutually perpendicular to each other, and in which said milling spindle holder is also movable relative to said frame in three coordinate directions mutually perpendicular to each other when not restrained by said clamping means, and in which said feeler holder is mounted for play relative to said spindle holder in three coordinate directions mutually perpendicular to each other.

3. A construction as defined in claim 1, in which said connecting means for connecting said feeler holder to said control member comprises a rocking lever mounted for swinging movement in a horizontal plane, and a double-armed lever mounted intermediate its ends on said rocking lever, one end of said double-armed lever being connected to said feeler holder, the other end of said double-armed lever being connected to said control member.

4. A construction as defined in claim 3, in which said double-armed lever is displaceable in a vertical direction with respct to said rocking lever as well as being swingable in a horizontal plane with respect to said rocking lever.

5. A construction as defined in claim 3, further including a supporting member (44) detachably mounted on said milling spindle holder (36), said rocking lever (68) being mounted on said supporting member (44) and said receiving member (54) being secured to and supported from said supporting member.

6. A construction as defined in claim 5, further including a pantograph (84) and an operative connection (82) between said pantograph and said feeler holder (80) which is connected to one end of said double-armed lever (72).

7. A construction as defined in claim 1, further including a connecting plug receivable in said receiving member in place of said servo-controller body when said body is removed therefrom, said connecting means then serving to connect said feeler holder to said connecting plug and thereby to connect it rigidly to said receiving member and said milling spindle holder, so that movement manually imparted to said feeler holder will cause corresponding movements of said spindle holder by direct manual force when said detachable clamping means is detached so that said spindle holder may move relative to said frame.

8. A construction as defined in claim 7, wherein said control member (92) of said servo-controller body (58) has a conical recess, and said connecting plug (60) has a similar conical recess, and said connecting means (72) includes a tapered pin (88) adapted to fit tightly into said conical recess of said control member when said controller body (58) is mounted on said receiving member (54) and adapted to fit tightly into said conical recess of said connecting plug (60) when said connecting plug is mounted on said receiving member (54).

9. A construction as defined in claim 1, wherein said connecting means includes a movable arm having one end engaged with said feeler holder and an opposite end in the vicinity of said receiving member and adapted to be engaged with said control member of said servo-controller body when said controller body is mounted on said receiving member, further including means for holding said opposite end of said arm in fixed relation to said receiving member when it is desired to maintain said milling spindle holder and said feeler holder in fixed relation to each other, said detachable clamping means being then unclamped to allow said milling spindle holder and said feeler holder to move together as a unit relative to said frame.

10. A construction as defined in claim 1, in which said tables are movable relative to said frame in three coordinate directions mutually perpendicular to each other, and in which said feeler holder is mounted for play relative to said spindle holder in three coordinate directions mutually perpendicular to each other.

References Cited

UNITED STATES PATENTS 3,266,375  8/1966  Reeber et al. _____ 90—13.1

FOREIGN PATENTS 976,461  11/1964  Great Britain.

GERALD A. DOST, Primary Examiner